Oct. 1, 1963  R. KAISER  3,105,403
TOOL COMPRISING ASSEMBLING MANDREL FOR SCREWING A HOSE
NIPPLE INTO A HOSE SOCKET ALREADY
SURROUNDING A HOSE END
Filed Jan. 4, 1961
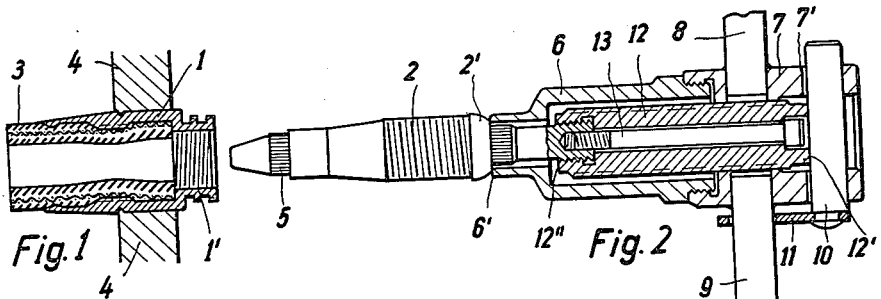
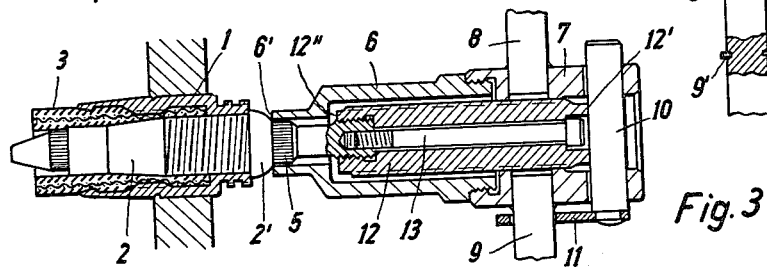
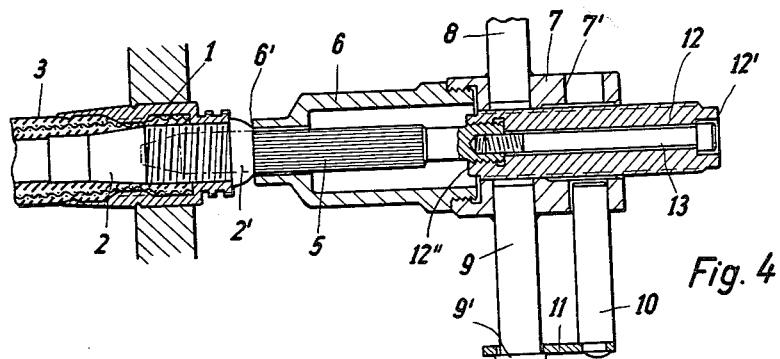
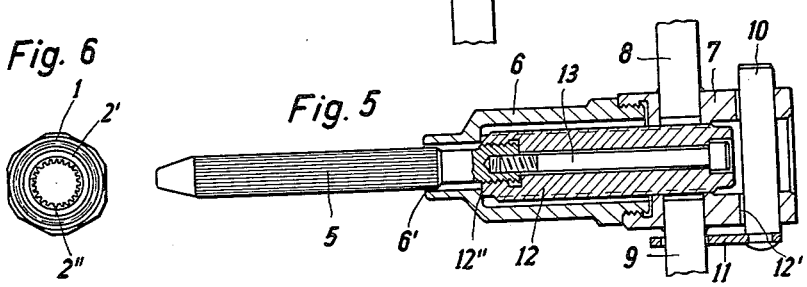
Inventor:
Rudolf Kaiser
By Ernest A. Marmorek
His Attorney.

United States Patent Office 3,105,403
Patented Oct. 1, 1963

3,105,403
TOOL COMPRISING ASSEMBLING MANDREL FOR SCREWING A HOSE NIPPLE INTO A HOSE SOCKET ALREADY SURROUNDING A HOSE END
Rudolf Kaiser, 18 Rohrerweg, Ettlingen, Baden, Germany
Filed Jan. 4, 1961, Ser. No. 80,634
Claims priority, application Germany Feb. 10, 1960
2 Claims. (Cl. 81—71)

A tool is known for assembling screw connections on hoses, said connections comprising a hose socket and a nipple which is provided with a union nut and whose internal diameter is equal to the internal diameter of the hose and which comprises a sealing cone. This tool is equipped with a mandrel which fits into the nipple and projects there-beyond, and also with a frictional engagement surface which fits on to the sealing cone of the nipple and is pressed by means of the union nut against the sealing cone. The use of this tool presupposes that before the nipple is screwed into the socket already arranged on the hose end, the nipple has been so tightly screwed on to the mandrel by means of the union nut, which remains on the fitting after the latter has been fully assembled, that the compressive force between the sealing surface on the tool and the sealing cone on the nipple is greater than the force which has to be applied for screwing the nipple into the hose socket. Thus, the transmission of force from the handle of the tool to the nipple which is to be screwed in is effected only by friction.

In the case of a very-high-pressure hose provided with an intermediate layer of wire gauze, relatively great forces have to be applied in order to screw the nipple into the socket already mounted on the hose end. But it is not only this fact which shows that there is a need for a new kind of assembling tool for screw connections in hoses, but also the further fact that the known tool described initially cannot be used for connections wherein there is no union nut arranged on the nipple before the said nipple is screwed in. More particularly if the hose nipple is made of a relatively soft material, e.g. brass, which is used in order to avoid corrosion, there is a need for an assembling tool and a nipple form with which relatively considerable torsional forces can be transmitted.

The tool with assembling mandrel constructed according to the present invention, which fulfills the aforesaid requirements and is intended for screwing a hose nipple into a socket already surrounding a hose end, the assembling mandrel projecting completely through the hose nipple and fitting exactly into the nipple bore, is characterised in that the assembling mandrel comprises at its outer periphery the same axial splining as the inner wall of the hose nipple. The screwing-in operation, in conjunction with the pre-loading conventionally used with high-pressure and very-high-pressure hoses, causes the relatively thin wall of the nipple to bear tightly against the assembling mandrel.

Since, for this reason, the assembling mandrel can be withdrawn from the nipple screwed into the hose socket only with the expenditure of considerable force, the assembling mandrel is connected to a screw member and the latter is guided in a housing part which is constructed as a nut and is equipped with handles and which is arranged in prolongation of a sleeve-like housing part which does not comprise an internal screwthread and which surrounds the upper end of the assembling mandrel adjacent the screw member, and whose end face bears on the head of the nipple both when the nipple is being screwed in and when the assembling mandrel is being removed from the nipple.

The axial movement of the screw member is limited within the housing surrounding it in such a manner that its end face adjacent the assembling mandrel bears against an inner shoulder of the housing when the said mandrel is in the position of maximum extension, and that, when the nipple is screwed in, its other end face bears against a pin which is mounted so as to be removable perpendicularly to the screw member axis in a bore of the housing part which is constructed as a nut. Owing to this bearing contact, the screw member which is fixedly connected to the assembling mandrel is entrained when the housing surrounding the said screw member is rotated. Only when the bearing pin has been removed from its bore in the housing part constructed as a nut, is the assembling mandrel, upon further rotation of the tool handles, removed from the assembled hose nipple. The position of furthest extension of the bearing pin is limited by a stop on the nut handle, on which the bearing pin is mounted by means of a transverse member fixed to the pin end.

One example of embodiment is illustrated in various working positions in FIGS. 1 to 6 of the accompanying drawings, in which:

FIG. 1 is a longitudinal sectional view of a hose socket which is arranged on a hose end and is fixed in clamping jaws.

FIG. 2 shows—partly in longitudinal section—the tool constructed according to the invention, the hose nipple to be screwed into the hose socket being arranged on the mandrel of the said tool.

FIG. 3 shows the position of the tool after the hose nipple has been screwed in.

FIG. 4 shows how the assembling mandrel is removed from the mounted hose nipple.

FIG. 5 shows the position of the assembling mandrel in which the bearing pin of the screw member is completely relieved of load and can be removed from the bore of the housing part which is constructed as a nut.

FIG. 6 is a view on to the asssembled hose screw connection in the axial direction.

The hose socket 1 is provided with a connecting head 1' on which coupling elements for the hose pipeline, for example, a union nut not shown in the drawings, can be mounted. Reference is had to my co-pending application Ser. No. 80,633 filed January 4, 1961. The socket 1 mounted on a hose end 3 is clamped in clamping jaws 4. The nipple 2 which is screwed into the socket 1 and the hose end 3 is provided with a nipple head 2' and is provided in its internal bore with axial splining 2". The assembling mandrel 5 comprises the same splining on its outer periphery. The mandrel 5 fits exactly without any clearance into the splined bore of the nipple 2, so that when the nipple is screwed in by means of the mandrel 5 it is possible to transmit very considerable force even if the nipple is made of relatively soft material.

The assembling mandrel 5 is screwed to the screw member 12 and this connection is secured by the bolt 13 which is arranged co-axially with both parts. The housing part 7 which is constructed as a nut is equipped with handles 8 and 9 and is screwed on to the screw member 12. The end face 12' of the said screw member which is remote from the assembling mandrel 5 bears, when the nipple 2 is screwed into the hose socket 1, on the pin 10 which is withdrawably mounted in the bore 7' of the housing part 7. The bearing pin 10 is mounted by means of a transverse member 11 fixed on its end, on the handle 9 of the nut 7 and its position of maximum withdrawal is limited by a stop 9' fixed on the aforesaid handle. As is shown in FIG. 4, the last-mentioned stop is so arranged that the pin 10 cannot be entirely withdrawn from its bearing bore 7'.

Screwed to the housing part 7 is the housing part 6 which is constructed as a tubular sleeve and, which in the working positions shown in FIGS. 2, 3 and 5, surrounds the upper end of the assembling mandrel 5 adjacent the screw member 12, and whose end face 6' bears on the head 2' of the nipple 2 both when the latter is screwed into the hose socket 1 and when the assembling mandrel 5 is once more removed from the assembled nipple.

In the position shown in FIG. 5, that end face 12" of the screw member 12 which faces towards the assembling mandrel 5 bears against an inner shoulder of the housing part 6. In this position the bearing pin 10 can be removed, relieved of load, from the bore 7' of the nut 7 as far as the abutment 9'. Only after the pin 10 has been removed can the screw member 12 issue from the nut part 7 when the latter is rotated in the same direction of rotation, and in this way withdraw the assembling mandrel 5 from the assembled nipple 2.

Thus, the foregoing shows that when the nipple 2 is screwed in and the splined mandrel 5 is removed from the nipple, the nut 7 has always to be rotated in the same direction by means of the handles 8 and 9. At withdrawal, all that has to be done is to open the way for the screw member 12 by pushing back the bearing pin 10.

I claim:

1. A tool, for use in connection with a thin-walled hose nipple having on its interior fine axial splines throughout its length and circumference and arranged for threading engagement into a hose socket surrounding the hose end, comprising a mandrel adapted to project through the hose nipple and having external fine axial splines adapted to fit into and to engage the internal splines of the nipple, and applicator means connected to said mandrel and releasably operable for imparting torque and axial movement in one direction to said mandrel and thereby to said nipple to engage the nipple in the socket and, respectively, propelling the mandrel axially in the opposite direction to withdraw the mandrel from the nipple emplaced in the socket, said applicator means comprising a screw member disposed axially of and releasably secured to said mandrel and being movable therewith and having an external screw thread, a nut engaging said external screw thread, and a stop element retractably activatable to a position across said screw member and said nut for tied rotation of said nut and screw member when said nut is turned, said screw member having a front face, said nut including a projection having an internal surface disposed in the path of said face, whereby the axial movement of the mandrel during torque imparting will be limited forwardly by the interengagement of said face with said surface and, respectively, rearwardly by said stop element, said stop element being retractable for clearing the path of the screw member for the withdrawal of the mandrel.

2. A tool, as claimed in claim 1, said stop element including a rod extending and movable at right angle to the mandrel axis thereby being activatable in a position wherein it projects into the retraction path of the screw member.

References Cited in the file of this patent

UNITED STATES PATENTS

| | | |
|---|---|---|
| 1,075,710 | Goodwin | Oct. 14, 1913 |
| 2,219,266 | Hirsch | Oct. 22, 1940 |
| 2,266,796 | Parker | Dec. 23, 1949 |
| 2,499,056 | Courtot | Feb. 28, 1950 |

FOREIGN PATENTS

| | | |
|---|---|---|
| 60,662 | Germany | Jan. 22, 1892 |
| 201 | Great Britain | 1897 |